United States Patent Office 3,380,535
Patented Apr. 30, 1968

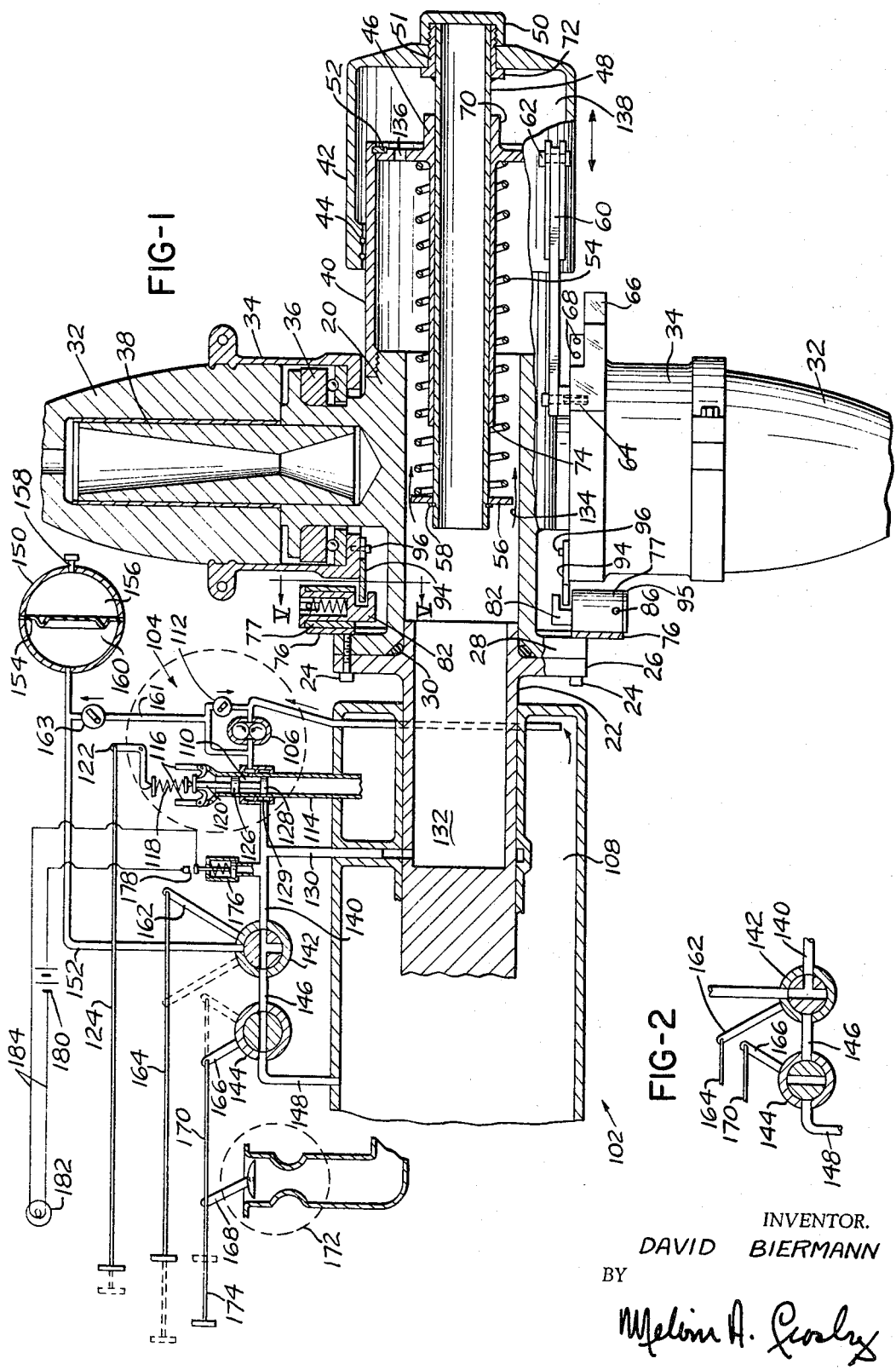

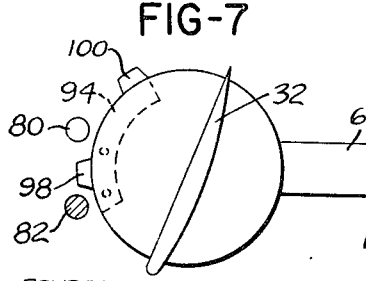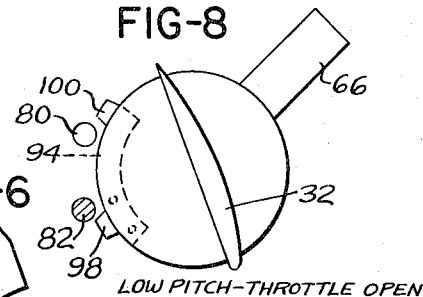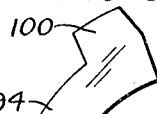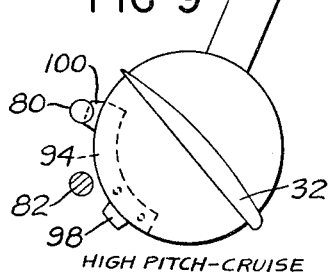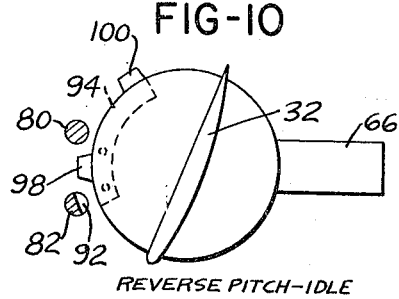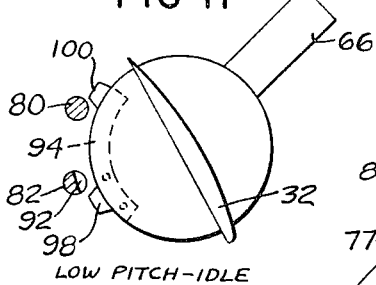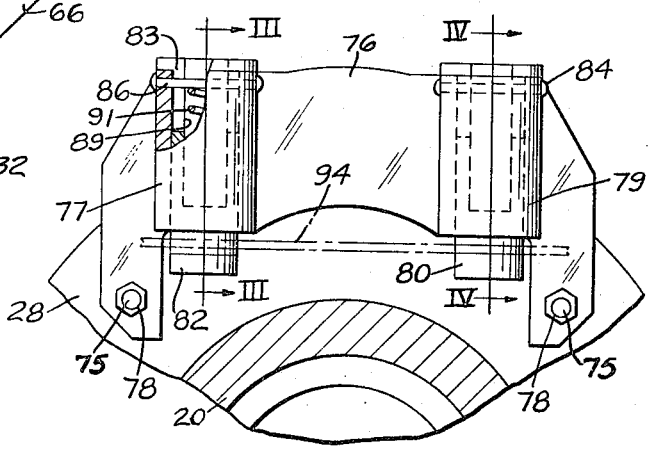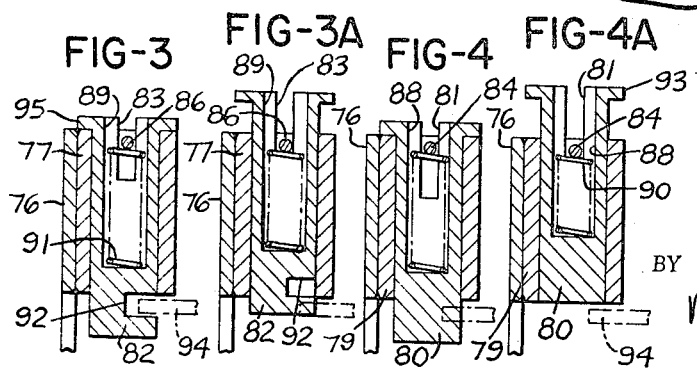

3,380,535
CONSTANT SPEED AND REVERSIBLE
AIRCRAFT PROPELLER
David Biermann, Piqua, Ohio, assignor to Hartzell Propeller, Inc., Piqua, Ohio, a corporation of Ohio
Filed Dec. 27, 1965, Ser. No. 516,388
13 Claims. (Cl. 170—160.2)

ABSTRACT OF THE DISCLOSURE

Variable pitch propeller in which the blades are movable from reverse pitch to high pitch and are spring urged toward high pitch position and are movable toward reverse pitch position by a fluid motor; with a first centrifugally operable stop which prevents movement of the blades to reverse pitch when the propeller speed is above a predetermined speed and a second centrifugally operable stop which prevents movement of the blades to high pitch position when the propeller is halted in a normal manner; together with a hydraulic system to control the supply of fluid to the fluid motor.

---

This invention relates to constant speed and reversible propellers intended primarily for aircraft and to a method of operation thereof.

Governor controlled constant speed propellers are known and have been in common use for many years. Reversible pitch propellers have also been in use; but they have been relatively complicated and sometimes require special provisions incorporated in the engine to make it possible to control the pitch properly throughout the various conditions encountered in flight and on the ground. Complicated control systems of such reversing pitch mechanisms have in the past, on occasions, malfunctioned, resulting in serious accidents.

With the limitations and disadvantages of currently available reversible propellers in mind, the primary object of the present invention is the provision of a new control system for reversibly controlling a simply constructed propeller and which system can be installed on substantially any engine even where the engine has no special provisions for reversible pitch propellers.

Another object of the present invention is the provision of a constant speed and reversible pitch propeller which has incorporated therein safety features making it impossible for the propeller to go into reverse pitch inadvertently.

Still another object of the present invention is the provision of a reversible propeller and control system therefor which can be installed on substantially any single engine aircraft with a minimum of cost and complexity.

Another object is the provision of an arrangement for extremely rapidly reversing the pitch of the propeller in order to make it possible to use the propeller for braking the aircraft during landing.

Still another object is the provision of a visual indicator which will show when the propeller blades are in the reverse pitch position.

Another object is the provision of a novel method of operating a reversing variable pitch propeller.

These and other objects and advantages of the present invention will become more apparent upon reference to the following specification taken in connection with the accompanying drawings in which:

FIGURE 1 is a schematic sectional view showing a constant speed propeller according to the present invention installed on a typical aircraft engine, together with the complete propeller control system;

FIGURE 2 is a fragmentary view showing valves of the system of FIGURE 1 adjusted to different positions;

FIGURE 3 is a section taken through the automatic low pitch stop and is indicated by line III—III on FIGURE 5 and shows the stop in its inner position;

FIGURE 3A is a view like FIGURE 3 but shows the stop in its outer position;

FIGURE 4 is a section taken through the automatic intermediate high pitch stop and is indicated by line IV—IV on FIGURE 5 and shows the stop in its inner position;

FIGURE 4A is a view like FIGURE 4 but shows the stop in its outer position;

FIGURE 5 is a view showing the automatic stop bracket forming the assembly of the low stop and intermediate high stop and is indicated by line V—V on FIGURE 1;

FIGURE 6 is a view showing the automatic stop plate which is attached to the propeller blade; and FIGURES 7 through 11 are schematic views showing the automatic low and intermediate high pitch stops for different pitch positions and engine power settings.

Referring to FIGURE 1, propeller hub 20 is shown mounted on engine shaft 22 by means of bolts 24 inserted through flanges 26 and 28 of the shaft and hub, respectively. Oil seal 30 between the hub and shaft prevents leakage of oil at the flanged joint.

Blades 32 are mounted on hub 20 by means of clamps 34 and bearings 36 and are rotatable on the hub about axes extending longitudinally of the blades. A pilot tube 38, fixed in hub 20, is provided as an axle upon which each blade 32 rotates.

A cylinder 40 is attached to hub 20 coaxial with the axis of rotation thereof and on the opposite side of the hub from shaft 22 as by the threads illustrated.

A piston 42 is slidably mounted on cylinder 40, and seal means 44 prevents leakage from between cylinder 40 and piston 42.

Attached to the front or outer closed end of cylinder 40, and extending into hub 20, is a pilot guide 46, held in place as by a snap ring 52, which supports a pilot tube 48 for axial movement, which in turn, is fastened to the front or outer closed end of piston 42 as by means of nut 50 threaded on sleeve 51 fixed to the end of tube 48. Compression spring 54 is compressed between pilot guide 46 and spring retainer 56; the latter being secured to pilot tube 48 by means of snap ring 58.

Piston 42 is linked to each blade clamp 34 by a link 60, which is pivotally attached to piston 42 by means of pin 62, and to the respective clamp 34 by means of link screw 64.

Counterweights 66 are attached to clamps 34 by means of bolts 68 and are operable to develop forces assisting spring 54 at least while the propeller is in cruising pitch range.

After movement of piston 42 toward hub 20 is limited by high stop 70 on the end of tube 46 which engages boss 72, formed on sleeve 51 on the end of pilot tube 48. Forward movement of piston 42 away from hub 20 is limited by reverse stop 74 at the inner end of tube 46 which engages spring retainer 56.

In addition to the high and reverse pitch stops described above, are automatic low pitch stop unit shown in FIGURE 3, and automatic intermediate high pitch stop unit shown in FIGURE 4 and which units are made up in an assembly shown in FIGURE 5. FIGURE 5 there is shown the automatic stop bracket 76 which is bolted to the front face of hub flange 28, by means of bolts 75 which pass through holes 78 provided in bracket 76, and into corresponding holes in flange 28 (see FIGURE 1). As will be seen in FIGURE 1, there is preferably an automatic stop bracket for each blade.

The bracket includes sleeves 77 and 79 in which the stop pins are slidable. Mounted for limited axial movement in sleeve 77 of bracket 76 is automatic low stop pin 82 and in sleeve 79 is mounted automatic intermediate high stop pin 80.

Stop pins 80 and 82 are provided with slots 81 and 83, respectively, through which extend pins 84 and 86, respectively, and which pins are fixed in sleeves 77 and 79. Stop pins 80 and 82 are provided with cavities 88 and 89, respectively, within which are mounted springs 90 and 91, respectively, which press against the ends of the cavities and the pins 84 and 86 thus urging the stop pins inwardly of their sleeves to cause their respective stop flanges 93 and 95 to engage the outer ends of sleeves 77 and 79. Automatic low stop pin 82 is provided with slot 92 through which a stop plate, described below, is moveable.

FIGURE 6 shows the stop plate 94, which is attached to clamp 34 by means of screws 96, as will be seen in FIGURE 1. Stop plate 94 is formed with low stop lug 98 and intermediate high stop lug 100. Low stop lug 98 cooperates with low stop pin 82 to control the movement of the propeller pitch from the forward regime to the reverse regime. Intermediate high stop lug 100 cooperates with intermediate high stop pin 80 to control the movement of the propeller pitch from low pitch to full high pitch. This control is obtained by changes in engine speed which changes the centrifugal force acting to throw pins 80 and 82 out away from the propeller axis of rotation, against the action of their springs 90 and 91.

At rotation speeds below a certain value, 1000 r.p.m. for example, the springs 90 and 91 hold the stop pins 80 and 82 in close to the axis of rotation, so that their flanges 90 and 91 engage the outer ends of sleeves 77 and 79. Under these conditions, low stop lug 98 can slide through slot 92, allowing the pitch to move into reverse. At rotational speeds above a prescribed value (1000 r.p.m.), low stop pin 82 moves out away from the axis of rotation by virtue of the greater centrifugal force produced by the higher speed. When the end of pin 82 moves outwardly until slot 83 engages pin 86, slot 92 of the stop pin is no longer aligned with stop lug 98 of stop plate 94, so that stop pin 82 will contact lug 98 thereby preventing the pitch from decreasing further into the reverse range.

The intermediate high stop pin 80 controls in the opposite fashion as the case for the low stop pin 82. At rotational speeds below the prescribed value (1000 r.p.m.), high stop pin 80 is in its inner position and will engage high stop lug 100 of stop plate 94, thereby preventing the blades 32 from moving into high pitch position. At rotational speeds above the prescribed value (1000 r.p.m.), high stop pin 80 moves out away from the propeller axis of rotation to its outer position, so that it no longer can contact high stop lug 100.

The action of the two automatic stops described above is shown in FIGURES 7 to 11 for different conditions and pitch angles. These figures will be discussed in detail subsequently when the operation of the propeller is described.

The propeller is installed on engine 102 which is partially shown. Mounted on engine 102 and driven thereby is a governor 104, the essential parts of which are contained within the dot dash circle in FIGURE 1. Governor 104 consists of a pump 106 which is driven by the engine, and which receives engine oil from engine oil reservoir 108 and discharges it under pressure into governor chamber 110. Relief valve 112 by-passes oil from discharge to inlet of pump when the pressure reaches a prescribed value.

The speed sensing portion of governor 104 consists of hollow shaft 114 which is geared (not shown) to engine shaft 22. Pivotally attached to shaft 114 are flyballs 116 which are acted upon by centrifugal force tending to throw them out away from the axis of rotation in opposition to the action of spring 118. Flyballs 114 and spring 118 cooperate to raise or lower pilot valve member 120 as a function of engine speed, the values of which can be regulated by adjusting the bias of spring 118 by lever 122 which is controlled by hand control rod 124.

Formed integrally with pilot valve member 120 are piston portions 126 and 128 which form the end wall portions of chamber 110. Piston 128 is machined so as to accurately cover port 129, formed in hollow shaft 114. This port, 129, communicates with the chamber 138 in propeller piston 42 by means of passages 130, 132, 134 and 136.

When the engine speed is below the value set for the governor to maintain, spring 118 overcomes the centrifugal force acting on flyballs 116 and forces pilot valve member 120 in a downward direction. Oil in chamber 110 will then discharge through port 129 and into the propeller piston chamber 138 via the aforementioned passages 130, 132, 134 and 136 thereby forcing the piston in the forward, or rightward, direction thereby *decreasing* the pitch of blades 32. This reduction of propeller pitch allows the engine to increase rotational speed, which corrects the underspeed condition.

When the engine speed is above the value set for the governor to maintain, the flyballs 116 raise pilot valve member 120, so that piston 128 uncovers port 129 so that oil from chamber 138 of piston 42 can discharge back into reservoir 108 through hollow shaft 114. The force developed by counterweights 66 when the propeller is rotating and spring 54 provide the force tending to move the piston 42 towards the left, which forces oil out of the propeller hydraulic motor formed by piston 42 and cylinder 40.

Also communicating with port 129 is channel 140 which communicates with engine reservoir 108 by way of channels 146 and 148, three way valve 142, and two way valve 144. Three way valve 142 also communicates with accumulator 150 by means of channel 152. Accumulator 150 may be of the type which consists of a closed vessel having two chambers or compartments separated by a flexible diaphragm 154. One compartment 156 if filled with a gas under pressure, which is charged into the compartment through valve 158. The oil compartment 160 is charged with oil from governor pump 106 by means of channel 161. Check valve 163 prevents reversal of flow back to the pump 106. The compartment 160 communicates with the aforementioned channel 152, which in turn communicates with channel 140 when three way valve 142 is in the position in which it is shown in FIGURE 2.

Valve 142 is manually moveable between its FIGURES 1 and 2 positions by lever 162 and push pull rod 164.

The two way valve 144 is controlled by a lever 166, which is connected to the engine carburetor throttle lever 168 by means of a link 170. The engine carburetor is shown diagrammatically in the dot dash circle 172 in FIGURE 1. The carburetor throttle lever 168 is manually controlled by push rod 174.

Also communicating with channel 140 is a pressure sensitive element 176 which closes electric contacts 178 when the pressure in channel 140 reaches a predetermined value. Closing of contacts 178 allows electricity from battery 180 to light up indicator light 182 via a circuit which includes wires 184.

Reversible propellers, which are controlled during normal powered flight by a constant speed governor, ordinarily are equipped with a hydraulic or mechanical low pitch stop to prevent the blades from going into reverse pitch when the r.p.m. falls below the governing r.p.m., such as when the aircraft is gliding in for a landing. After landing, the low pitch stop is released in order to permit the propeller pitch to be reversed. Such a low pitch stop control mechanism usually requires special provisions in the engine for actuation of the mechanism, which are not present in most engines.

The present reversible propeller operates in a different way, in that instead of relying on a low pitch stop to prevent reversal of pitch, the governor is overridden during power-off conditions, so that it cannot move the blade pitch into reverse. The pitch then goes high by virtue of the counterweights 66 and spring 54.

Safety low pitch stops are introduced, however, as backup devices to prevent inadvertent reversal while the aircraft is in the air, in the event the governor malfunctions and starts to move the pitch into reverse. These stops are centrifugal devices which operate at prescribed engine or propeller speeds.

Engine starting

When the engine is started, the propeller pitch is in the low pitch position; viz. with lug 100 resting against high stop pin 80, which prevents spring 54 from moving the piston 42 back into the high pitch position. (See FIGURES 1 and 11.)

Taxi

The pitch remains in the same position as when the engine was started. The throttle 172 remains nearly closed and the oil being supplied by governor 104 is by-passed back into the engine reservoir 108 through channels 140, 146, and 148 because valves 142 and 144 are open. The engine speed will increase to a value sufficient to produce the desired thrust or speed of the craft. An engine speed of, say, 1000 r.p.m., will cause stop pin 82 to move out, so that, in the event the throttle is moved to a position to close valve 144, the governor 104 cannot move the pitch into reverse position, because lug 98 will contact stop pin 82, preventing reversal of pitch.

Take-off

The throttle 172 is opened up which will cause valve 144 to close. The governor 104 takes charge of the pitch, moving it to a point where the engine and propeller speed reaches the governor setting. The low pitch stop pins 82 move out to prevent the pitch going into reverse in case of governor malfunctioning, while the intermediate stop pins 80 also move out allowing the propeller pitch to increase as the air speed increases. (See FIGURE 8.)

Cruise

The governor 104 controls the pitch. Valve 144 is closed. The propeller pitch moves to the high end of the range. The low stop pins 82 remain in outer position, preventing reversal of pitch in case of governor malfunctioning, and also preventing the pilot from reversing the pitch intentionally. (See FIGURE 9.)

Glide-power off

The throttle 172 is closed. Valve 144 is opened. The governor 104 is by-passed to the reservoir or sump 108. The blades 32, in the absence of pressure in piston 42, go to full high pitch and remain there during landing. (See FIGURE 9.) The propeller rotational speed during glide remains higher than the value at which the stop pins 82 move in except at the final touchdown when the propeller speed drops. The low pitch stop pins 82 prevent reversal in case of any malfunctions or in case the pilot moves the reverse control into reverse until the aircraft has reached the ground.

Landing

At ground contact, the pilot pulls the reverse control pull rod 164 "out." This moves valve 142 to the position shown in FIGURE 2. The governor 104 starts pumping oil into the propeller and, at the same time, the charge of oil in the chamber 160 of accumulator 150 is released to the propeller. This moves the blades 32 into reverse position almost instantly. (See FIGURE 10.) The pilot then opens the throttle 172 for full reverse. As the engine and propeller speed rises to above, say, 1000 r.p.m., the low pitch stop pins 82 move out and lock the propeller in reverse position. (See FIGURE 7.) This prevents the governor from releasing oil from the propeller in case the speed reaches the governing speed value. The signal light 182 comes on when the pitch reaches the reverse position, due to the high pressure in channel 140 which moves piston 176 out to close contacts 178.

After the aircraft has been brought to a halt, the throttle is closed, and the engine and propeller speed drops to below, say, 1000 r.p.m. The reverse control rod 164 is pushed back in, which moves valve 142 back to the position shown in FIGURE 1.

This allows oil from the propeller to drain back to the engine, by virtue of spring 54 acting to move piston 42 leftwardly to the low pitch position. Intermediate high stop pin 80, which is now in its inner position, prevents the pitch from going to the full high position. (See FIGURE 11.)

If a landing is made without the use of reverse, the pitch will be in full high as shown in FIGURE 9, and not against the intermediate high pitch stop, as shown in FIGURE 11. Before the engine is shut down, it is standard procedure to move the pitch in to a lower value, or against the intermediate high pitch stop as shown in FIGURE 11, by pulling out on the reverse control momentarily. The propeller will then be in low pitch position, which is desirable for the next engine start.

What is claimed is:

1. A reversible propeller comprising; a propeller hub adapted for being attached to an engine shaft for rotation thereby, blades extending substantially radially from said hub and pivotally mounted thereon for rotation about their respective longitudinal axes, hydraulic motor means connected between said hub and said blades operable in response to a supply of pressure fluid thereto for moving the blades to reduce the pitch thereof and to move the blades to reverse pitch, a source of pressure fluid for supplying hydraulic fluid to said hydraulic motor means, resilient means acting on said blades in opposition to said hydraulic motor means and biasing said blades toward high pitch position, elements of fixed stop means operatively connected to said blades and said hub interengageable for stopping the rotational movement of said blades about their axes at predetermined extreme high and reverse pitch positions, elements of moveable low pitch stop means operatively connected to said blades and said hub positioned as to be effective at a pitch position between said predetermined extreme high and reverse pitch positions, said low pitch stop means being ineffective below a predetermined rotational speed of the propeller while preventing movement of the blades into reverse pitch at propeller rotational speeds above said predetermined speed, and control means connected between said source and said hydraulic motor means for regulating the supply of fluid from said source to said hydraulic motor means and from said hydraulic motor means to exhaust.

2. A reversible propeller according to claim 1, which includes elements of a moveable intermediate high pitch stop means operatively connected to said blades and said hub and positioned to be effective at a pitch position between said predetermined extreme high pitch position and the pitch position at which said moveable low pitch stop means is effective, said intermediate high pitch stop means being ineffective above a predetermined rotational speed of the propeller while preventing the blades from moving to the full high pitch position at propeller rotational speeds below said predetermined rotational speed.

3. A reversible propeller according to claim 1, which includes centrifugal responsive weights attached to said blades in such position as to tend to move said blades towards high pitch position when the propeller rotates.

4. A reversible propeller according to claim 2, which includes centrifugal responsive weights attached to said blades in such position as to tend to move said blades towards high pitch position when the propeller rotates.

5. A reversible propeller according to claim 1 in which said control means includes engine driven governor means and manually operable means selectively operable for by-passing the fluid from said governor back to said reservoir for preventing reversal of pitch of the propeller except when desired.

6. A reversible propeller according to claim 1 wherein said moveable low pitch stop means comprises a centrifugally responsive latch which engages a lug attached to one of said blades when the rotational speed exceeds a prescribed value preventing said blade from moving to the reverse pitch position, and which is restored to a position of disengagement from said lug by a resilient member when the rotational speed is below a prescribed value.

7. A reversible propeller according to claim 6, including a moveable intermediate high pitch stop means located between said high pitch stop means and said moveable low pitch stop means which prevents movement of said blades to the high pitch position when the propeller rotational speed is below a prescribed value.

8. A reversible propeller according to claim 7 wherein said moveable intermediate high pitch stop means comprises a spring loaded latch which engages a lug attached to one of said blades when the rotational speed of said propeller remains below a prescribed value preventing said blade from moving to the high pitch position and which disengages from said lug by means of centrifugal force when the rotational speed of said propeller exceeds a prescribed value.

9. A reversible propeller comprising: a propeller hub attached to an engine shaft for rotation therewith, blades pivotally mounted on said hub for rotation about their axes, a hydraulic motor means mounted on said hub and connected to said blades for moving them into reverse pitch position, a fluid reservoir, governor means for supplying fluid from said reservoir to said motor means when the propeller rotational speed drops below a prescribed value and draining fluid from said motor means to said reservoir when the rotational speed exceeds a prescribed value, resilient means opposing said hydraulic motor means and biased to move said blades to the high pitch position, fixed high and reverse stop means limiting the rotational movement of said blades about their axes to a range between high and reverse pitch positions, a fluid passage connecting said reservoir with said hydraulic motor means, a first manually operable valve closing said fluid passage for reverse operation of said propeller, a second manually operable valve mechanically linked to the engine throttle closing said fluid passage when said throttle is opened a prescribed amount and a movable low pitch stop means located between said high and reverse pitch stops which prevents movement of said blades into reverse pitch at propeller rotational speeds above a prescribed value.

10. A reversible propeller according to claim 9, which includes centrifugal responsive weights attached to said blades in such position as to tend to move said blades towards high pitch position when the propeller rotates.

11. A reversible propeller according to claim 9, which includes elements of a moveable intermediate high pitch stop means operatively connected to said blades and said hub and positioned to be effective at a pitch position between said predetermined extreme high pitch position and the pitch position at which said moveable low pitch stop means is effective, said intermediate high pitch stop means being ineffective above a predetermined rotational speed of the propeller while preventing the blades from moving to the full high pitch position at propeller rotational speeds below said predetermined rotational speed.

12. A reversible propeller according to claim 9 which includes a pressure responsive electrical switch hydraulically communicating with said hydraulic motor means, said switch including contact means which close when the pressure in said hydraulic motor means reaches a predetermined value, a source of electrical energy, and a signal light in closed electrical circuit with said source of electrical energy and said contact means so as to light when said contact means close.

13. A reversible propeller comprising: a propeller hub attached to an engine shaft for rotation therewith, blades pivotally mounted on said hub for rotation about their axes, a hydraulic motor means mounted on said hub and connected to said blades for moving them into reverse pitch position, a fluid reservoir, governor means including a booster pump for supplying fluid from said reservoir to said motor means when the propeller rotational speed drops below a prescribed value and draining fluid from said motor means to said reservoir when the rotational speed exceeds a prescribed value, resilient means opposing said hydraulic motor means and biased to move said blades to the high pitch position, fixed, high pitch and reverse pitch stop means limiting the rotational movement of said blades about their axes to a range between high pitch and reverse pitch positions, a fluid passage connecting said reservoir with said hydraulic motor means, a hydraulic accumulator means receiving fluid under pressure from said booster pump and storing the fluid against the pressure from a second resilient means, a first manually operable three way valve closing said fluid passage from said reservoir to said hydraulic motor means and at the same time hydraulically connecting said accumulator with said hydraulic motor means for rapid movement of said blades into reverse position, a second manually operable valve mechanically linked to the engine throttle closing said fluid passage when said throttle is opened a prescribed amount, and a movable low pitch stop means located between said high pitch and reverse pitch stop means which prevents movement of said blades into reverse pitch at propeller rotational speed above a prescribed value.

References Cited

UNITED STATES PATENTS

| | | | |
|---|---|---|---|
| 2,722,985 | 11/1955 | Biermann | 170—160.21 |
| 2,986,222 | 5/1961 | Biermann | 170—160.2 |
| 3,070,174 | 12/1962 | Toulmin | 170—160.2 X |
| 3,115,937 | 12/1963 | Biermann | 170—160.2 X |
| 3,167,131 | 1/1965 | Voisard | 170—160.21 X |
| 3,175,620 | 3/1965 | Newton | 170—160.2 X |

EVERETTE A. POWELL, Jr., *Primary Examiner.*